United States Patent
El-Zahab et al.

(10) Patent No.: US 11,588,144 B2
(45) Date of Patent: Feb. 21, 2023

(54) BATTERY CATHODES FOR IMPROVED STABILITY

(71) Applicant: The Florida International University Board of Trustees, Miami, FL (US)

(72) Inventors: Bilal El-Zahab, Miami Beach, FL (US); Amir Chamaani, Miami, FL (US); Neha Chawla, Miami, FL (US); Meer Safa, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/344,413

(22) Filed: Jun. 10, 2021

(65) Prior Publication Data
US 2021/0305548 A1   Sep. 30, 2021

Related U.S. Application Data

(60) Continuation of application No. 17/097,674, filed on Nov. 13, 2020, now Pat. No. 11,038,160, which is a continuation-in-part of application No. 16/901,398, filed on Jun. 15, 2020, now Pat. No. 10,862,103, which is a division of application No. 16/235,049, filed on Dec. 28, 2018, now Pat. No. 10,734,636.

(60) Provisional application No. 62/612,036, filed on Dec. 29, 2017.

(51) Int. Cl.
| | |
|---|---|
| H01M 4/133 | (2010.01) |
| H01M 4/1393 | (2010.01) |
| H01M 10/0525 | (2010.01) |
| H01M 4/62 | (2006.01) |
| H01M 4/76 | (2006.01) |

(52) U.S. Cl.
CPC ......... *H01M 4/133* (2013.01); *H01M 4/1393* (2013.01); *H01M 4/625* (2013.01); *H01M 4/76* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2011/0104576 A1* | 5/2011 | Johnson | H01M 4/131 429/405 |
| 2013/0196237 A1 | 8/2013 | Jin | |
| 2013/0341835 A1 | 12/2013 | Bhatt | |
| 2014/0127596 A1* | 5/2014 | Sun | H01M 12/08 429/405 |
| 2015/0050563 A1* | 2/2015 | Yamada | H01M 4/134 429/188 |
| 2019/0123332 A1* | 4/2019 | Luo | H01M 10/052 |

* cited by examiner

*Primary Examiner* — Christopher P Domone
(74) *Attorney, Agent, or Firm* — Saliwanchik, Lloyd & Eisenschenk

(57) ABSTRACT

A lithium battery and method for fabricating the same are provided herein. The battery cathode comprises a carbon structure filled with a catalyst, such as palladium-catalyst-filled carbon nanotubes (CNTs). The carbon structure provides a barrier between the catalyst and the electrolyte providing an increased stability of the electrolyte during both discharging and charging of a battery.

19 Claims, 9 Drawing Sheets

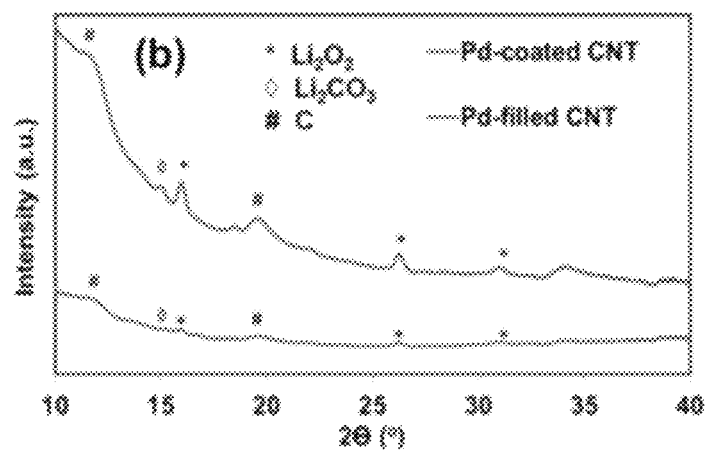
Figure 6(b)
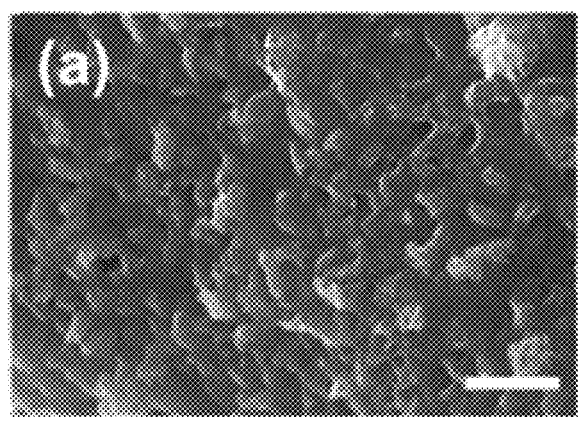 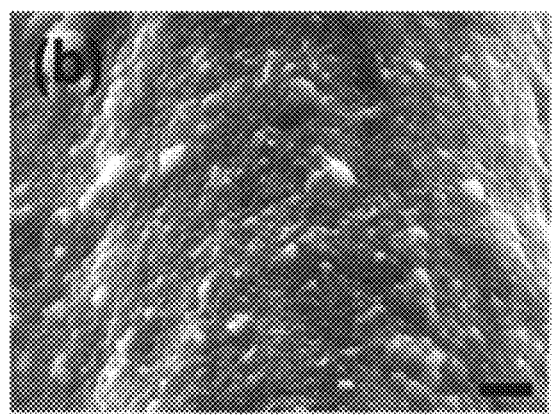
Figure 7(a)          Figure 7(b)

BATTERY CATHODES FOR IMPROVED STABILITY

CROSS-REFERENCE TO RELATED APPLICATIONS

The present application is a continuation application of U.S. patent application Ser. No. 17/097,674, filed Nov. 13, 2020, which will issue as U.S. Pat. No. 11,038,160 on Jun. 15, 2021, which is a continuation-in-part application of U.S. patent application Ser. No. 16/901,398, filed Jun. 15, 2020, now U.S. Pat. No. 10,862,103, issued Dec. 8, 2020, which is a divisional application of U.S. patent application Ser. No. 16/235,049, filed Dec. 28, 2018, now U.S. Pat. No. 10,734,636, issued Aug. 4, 2020, which claims the benefit of U.S. Provisional Application Ser. No. 62/612,036, filed Dec. 29, 2017, the disclosures of each of which are hereby incorporated by reference in their entirety, including all figures, tables, or drawings.

BACKGROUND

The search for high energy density batteries has motivated research in lithium-air batteries. Catalysts have been shown to improve both the battery capacity and the recyclability of these batteries when used in cathodes.

High energy density batteries have garnered much attention in recent years due to their demand in electric vehicles. Lithium oxygen (Li—$O_2$) batteries have nearly 10 times the theoretical specific energy of common lithium-ion batteries and in that respect have been regarded as the batteries of the future. A typical Li—$O_2$ battery comprises a Li anode, a porous cathode open to oxygen, and a $Li^+$ ion conducting electrolyte separating the electrodes. A Li—$O_2$ battery stores energy via a simple electrochemical reaction (2Li+ $O_2 \leftrightarrows Li_2O_2$) in which $Li_2O_2$ is deposited on the surface of the cathode via a forward reaction (oxygen reduction reaction, ORR) during discharge and a backward reaction (oxygen evolution reaction, OER) takes place during charging to decompose $Li_2O_2$ on the surface of cathode. Since the main discharge product ($Li_2O_2$) and other discharge/charge byproducts in Li—$O_2$ batteries are electrically insulating and not soluble in electrolytes, the structure and electronic conductivity of cathode materials have been critical factors in determining the limiting capacity of Li—$O_2$ batteries. Carbonaceous materials such as carbon nanoparticles, carbon nanofibers, carbon nanotubes, graphene platelets, and other forms of carbons have been commonly used as cathode materials in Li—$O_2$ batteries. Among carbon-based materials, carbon nanotubes (CNTs) have been widely used in Li—$O_2$ cathodes due to their high specific surface area, good chemical stability, high electrical conductivity, and large accessibility of active sites. CNT (single-walled) have been used as cathode materials in Li—$O_2$ batteries and shown discharge specific capacities as high as 2540 mAh·$g^{-1}$, which were obtained at a 0.1 mA·$cm^{-2}$ discharge current density. Although many research studies have been done to improve the performance metrics of Li—$O_2$ batteries, they are still in their early stages and many technical challenges have to be addressed before their practical applications.

The most common problems impeding the development of Li—$O_2$ batteries have been low rate capability, poor recyclability, and low round-trip efficiency. All of these issues are originally stemmed from sluggish kinetics and the irreversible characteristic of the OER and ORR reactions which causes high overpotentials in the discharging/charging process. Hence, increasing the efficiency of OER/ORR reactions and minimizing the overpotentials during the discharging/charging process have been regarded as a meaningful approaches to overcome the aforementioned problems in Li—$O_2$ batteries.

Various additives have been explored to remedy this problem including the use of redox mediators. Redox mediators minimize charge polarization by acting as charge carriers between the cathode and $Li_2O_2$ surface. Alternatively, different noble metals and metal oxide catalysts have also been integrated in the cathodes of Li—$O_2$ batteries. The catalyst may influence the performance of Li—$O_2$ batteries by destabilizing the oxidizing species which decreases the charging overpotential. They may also increase the surface active sites and facilitate charge transport from oxidized reactants to the electrode which can also lead to formation of nanocrystalline $Li_2O_2$. However, it has been recently shown that the catalyst on the oxygen cathode in Li—$O_2$ batteries is easily deactivated due to continuous accumulation of discharge and charge products upon cycling. It also has been reported that coarsening and agglomeration of catalyst upon charging/discharging reduces the efficiency of catalyst in Li—$O_2$ batteries. Platinum (Pt) and palladium (Pd) catalysts have been reported to promote $Li_2O_2$ oxidation at low potentials but also cause electrolyte decomposition resulting in the formation of $Li_2CO_3$ and thus deactivating the catalysts.

BRIEF SUMMARY

Embodiments of the subject invention provide Li-oxygen (Li—$O_2$) cathodes using palladium-filled carbon nanotubes (CNTs) that increase the stability of the electrolyte during both discharging and charging of a battery. The combination of Li—$O_2$ cathodes and Pd-filled CNTs can be applied to lithium-ion batteries, lithium-silicon, lithium-sulfur, lithium oxygen, as well as other non-lithium based batteries.

In an embodiment, a lithium battery can comprise: an anode including a lithium metal; a cathode disposed on the anode; and an electrolyte disposed between the anode and the cathode, the cathode comprising a carbon cloth gas diffusion layer and a carbon structure with a metal catalyst or a metal oxide catalyst, the metal catalyst or the metal oxide catalyst including a platinum group metal.

In another embodiment, a battery can comprise: an anode; a cathode disposed on the anode; and a separator including an electrolyte and disposed between the anode and the cathode, the cathode comprising a carbon cloth gas diffusion layer, a carbon structure, and a nanoparticle catalyst, and the nanoparticle catalyst including a platinum group metal.

In yet another embodiment, a battery can comprise: an anode including a lithium metal; a cathode disposed on the anode; and a separator including an electrolyte and disposed between the anode and the cathode; a stainless steel tube disposed on the cathode; and a stainless steel rod disposed on the anode, the cathode comprising a carbon cloth gas diffusion layer, a multi-walled carbon nanotube coated on the carbon cloth gas diffusion layer, and a palladium nanoparticle catalyst coated on a surface of the multi-walled carbon nanotube or filled in the multi-walled carbon nanotube, the separator being a polypropylene, and the electrolyte including a lithium salt.

BRIEF DESCRIPTION OF DRAWINGS

FIG. 6(b) is a plot of an x-ray diffraction patterns confirming the presence of $Li_2O_2$ and $Li_2CO_3$ in Pd-coated and Pd-filled discharged cathodes.

FIG. 7(a) is an image of a scanning electron micrograph of cathodes after discharge for pristine CNTs.

FIG. 7(b) is an image of a scanning electron micrograph of cathodes after discharge for Pd-coated CNTs.

DETAILED DESCRIPTION

Embodiments of the subject invention provide Li-oxygen (Li—$O_2$) cathodes using palladium-coated and palladium-filled carbon nanotubes (CNTs). It should be appreciated by one of ordinary skill in the art that the CNTs can be replaced with various catalysts (for example, ruthenium, or platinum-based catalysts) filled carbon structures, (for example fullerenes, buckminsterfullerenes, or graphenes). Empirical data shows that the full discharge of batteries in a 2-4.5 V range shows 6-fold increase in the first discharge cycle of the Pd-filled over the pristine CNTs and 35% increase over their Pd-coated counterparts. The Pd-filled also exhibits improved cyclability with 58 full cycles of 500 $mAh·g^{-1}$ at current density of 250 $mA·g^{-1}$ versus 35 and 43 cycles for pristine and Pd-coated CNTs, respectively. The effect of encapsulating the Pd catalysts inside the CNTs leads to increased stability of the electrolyte during both discharging and charging of the battery. Voltammetry, Raman spectroscopy, FTIR, XRD, UV/Vis spectroscopy and visual inspection of the discharge products using scanning electron microscopy can be used to confirm the improved stability of the electrolyte due to this encapsulation and that this approach could lead increasing the Li—$O_2$ battery capacity and cyclability performance.

Multi-walled carbon nanotubes (MWCNTs) can be decapped by nitric acid solution treatment and then 1 mM aqueous solution of $PdCl_2$ can be used to swell 100 mg of decapped MWCNTs until a slurry is formed. Pd-coated CNTs can also be prepared following the same procedure on untreated capped MWCNTs. Both slurries of Pd-coated and Pd-filled MWCNTs can be dried overnight at room temperature and calcinated in air at 350° C. for 2 hours. Corresponding particles can then be hydrogenated in an oven under hydrogen gas to yield ~5 wt % Pd nanoparticles. Cathodes can be prepared by coating a slurry of MWCNT (Pristine, Pd-filled and Pd-coated)/PVDF (90/10 wt % in NMP) on a 0.5" diameter carbon cloth gas diffusion layer (CCGDL) followed by drying at 120° C. for 12 hours. The cathodes can then be stored in an Ar-filled glove box to be used later. The typical loading of MWCNT can be 0.5±0.01 mg. All reported capacities in this application are reported per total mass of active cathode (CNTs and catalyst).

Figure 1:
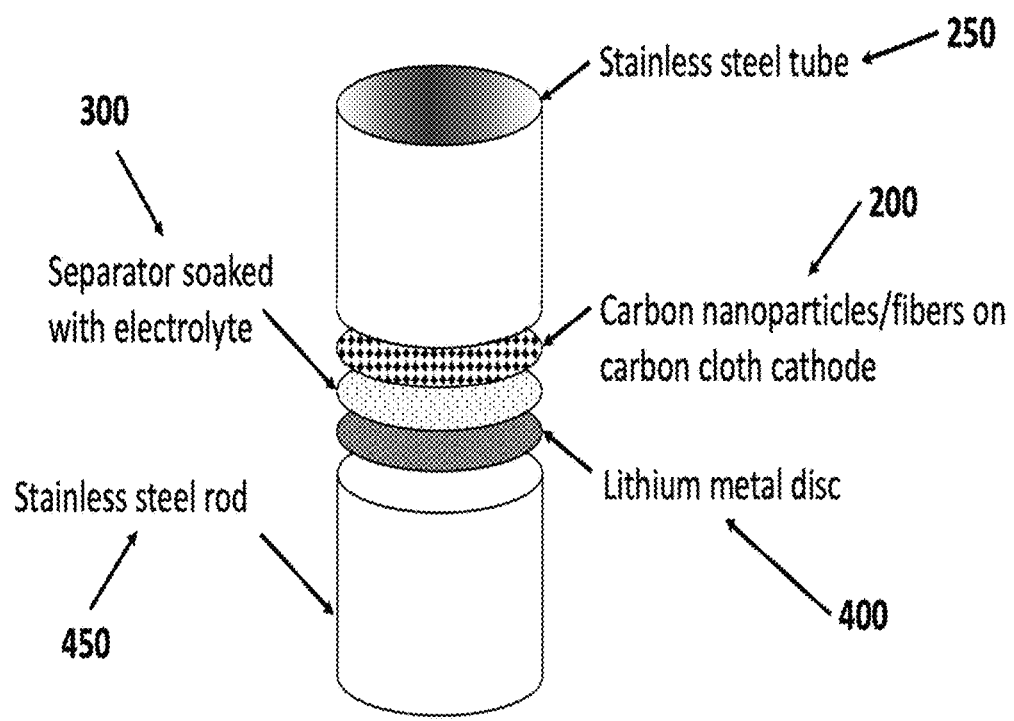
FIG. 1 shows a Li—$O_2$ battery according to an embodiment of the subject invention.

FIG. 1 shows a Li—$O_2$ battery according to an embodiment of the subject invention. Referring to FIG. 1, the Li—$O_2$ battery 100 comprises a cathode 200, an anode 400, and an electrolyte 300 disposed between the cathode 200 and the anode 400. The Li—$O_2$ battery 100 further comprises a conductive current collector 250 (e.g., a porous conductive current collector) disposed on the cathode 200 and a conductive current collector 450 disposed on the anode 400; the conductive current collector 250 disposed on the cathode 200 can be a tube, and the conductive current collector 450 disposed on the anode 400 can be a rod. The Li—$O_2$ battery 100 can be assembled by using a Swagelok type cell, in which the tube 250 is a stainless steel tube and the rod 450 is a stainless steel rod. The electrolyte 300 can be formed as a separator soaked with an electrolyte, and the separator can be a polyolefin (e.g., polypropylene). The anode 400 is formed by a lithium metal disk including a lithium metal.

The cathode 200 comprises a carbon structure with a metal catalyst or metal oxide catalyst, wherein the metal catalyst or metal oxide catalyst includes a platinum group metal. The platinum group metal includes at least one of ruthenium, rhodium, palladium, osmium, iridium, and platinum. In an embodiment of the subject invention, a palladium nanoparticle catalyst is coated on a surface of the carbon structure or filled in the carbon structure. In addition, the cathode 200 further comprises the CCGDL, and the carbon structure having a platinum group metal catalyst is coated on the CCGDL. The cathode 200 includes a porous structure open to an oxygen and the CCGDL has a woven structure.

Figure 2:
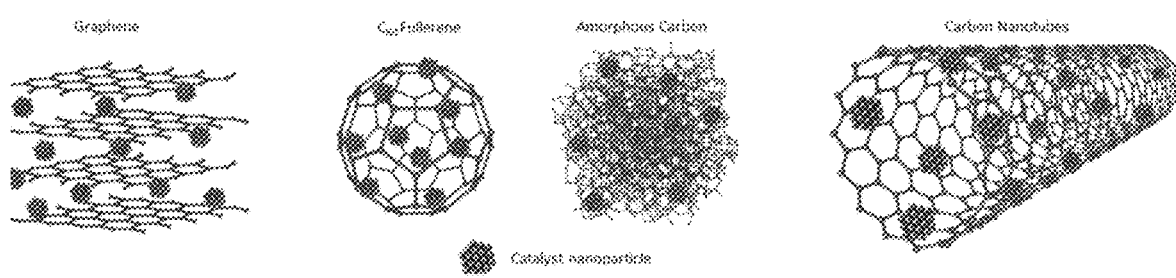
FIG. 2 shows a plurality of carbon structures of a Li—$O_2$ battery according to an embodiment of the subject invention.

FIG. 2 shows a plurality of carbon structures of a Li—$O_2$ battery according to an embodiment of the subject invention. Referring to FIG. 2, the carbon structure of Li—$O_2$ battery includes at least one of graphene, fullerenes, amorphous carbons, and carbon nanotubes. The carbon nanotubes can be a single-walled carbon nanotube or a multi-walled carbon nanotube.

Referring to FIGS. 1 and 2, the electrolyte 300 can be prepared by adding 1 mol·$kg^{-1}$ of LiTFSI salt (i.e., Lithium salt) into tetraethyl glycol di-methyl ether (TEGDME) solvent. The lithium metal disc of the anode 400 is covered by an electrolyte soaked separator, MWCNT-CCGDL and a stainless steel mesh can be used as a current collector. Li—$O_2$ batteries can be rested inside an Ar-filled glove box overnight before electrochemical tests. All electrolyte preparation and cell assembly can be performed inside an Ar-filled glove box (<1 ppm $O_2$ and <0.1 ppm $H_2O$).

The Li—$O_2$ batteries can be removed from the argon glove box and placed in the gastight desiccator filled with ultra-high purity oxygen gas (Airgas, purity>99.994%). The batteries can be rested under oxygen for 5 hours before testing.

In certain embodiments of the subject invention, the CNTs can be prepared such that the Pd nanoparticles fill the carbon nanotubes without a Pd surface coating. CNTs can be decapped by introducing the nanotubes to an acid treatment. The decapped CNTs can then be rinsed with water in order to remove any remaining acid treatment. The decapped CNTs can be dried and then immersed into a palladium salt solution and swelled until a slurry is formed. The CNTs can remain in the palladium salt solution until such time that the nanotubes are filled. The CNTs can then be dried, in a drying device, under oxygen to convert the pallidum salt to palladium oxide particles. The CNTs can then be rinsed to remove any debris remaining on the surface of the nanotubes. The CNTs can then be hydrogenated in a furnace to convert the palladium oxide into palladium. The Pd-filled CNTs can then be stored, for example in Argon, until future use.

As materials of the Li—$O_2$ battery 100 according to the present invention, Palladium (II) chloride ($PdCl_2$, 59% Pd), Bis (trifluoromethane) sulfonamide (LiTFSI, purity>99.95%), tetraethylene glycol dimethyl ether (TEGDME, purity>99.00%), N-Methylpyrrolidine (NMP, purity>97.00%), multi-walled carbon nanotubes (MWCNT, D=5-20 nm, L=5 µm, purity>95.00% carbon basis), Titanium (IV) oxysulfate ($TiOSO_4$) (≥29% Ti (as $TiO_2$) basis), and Lithium Peroxide ($Li_2O_2$) can be used. In addition, carbon cloth gas diffusion layer (CCGDL, thickness ~300 µm), Lithium foil chips (purity>99.90%), a polypropylene separator (thickness ~25 µm), and Polyvinylidene fluoride (PVDF) can be also be used.

A Solartron 1470 battery tester can be used for galvanostatic discharge/charge tests within a voltage range of 2.0-4.5 V at a current density of 250 mA·$g^{-1}$. Voltammetry measurements are performed by an electrochemical workstation (Gamry reference 600) at the rate of 1 mV·$s^{-1}$ in the range of 2.0-4.5 V to investigate the catalytic behavior of oxygen electrodes. All charge/discharge and electrochemical tests are measured in a temperature controlled environment at 25° C. After charge/discharge cycling, the oxygen cathodes are recovered from the batteries in the Ar-filled glove box, rinsed with acetonitrile and dried under vacuum. Cathodes can be investigated by Raman spectroscopy (BaySpec's Nomadic, excitation wavelength of 532 nm), Fourier transform infrared (FTIR) spectroscopy (JASCO FT-IR 4100), and Scanning electron microscopy (SEM) (JEOL 6330F). Bruker GADDS/D8 X-ray powder diffraction (XRD) with MacSci rotating Molybdenum anode (λ=0.71073) operated at 50 kV generator and 20 mA current is also used to collect the diffraction patterns. A parallel X-ray beam in size of 100 µm diameter is directed on to the samples and diffraction intensities are recorded on large 2D image plate during exposure time. $Li_2O_2$ is quantified in the cathodes after discharge using a colorimetric method. Briefly, discharged cathodes are first immersed in water then aliquots are taken and added to 2% aqueous solution of $TiOSO_4$. Instantaneously a color change occurred and the absorbance spectra of the solutions are collected using a UV-Vis spectrophotometer (Gamry UV/Vis Spectro-115E). The peak intensity at 408 nm is calibrated against solutions with known concentrations of $Li_2O_2$, in the range of 0.1 to 10 mg/ml and linear calibration curve is obtained. Transmission Electron Microscopy (Phillips CM-200 200 kV) is also used to inspect the carbon nanotubes.

Figure 3A:
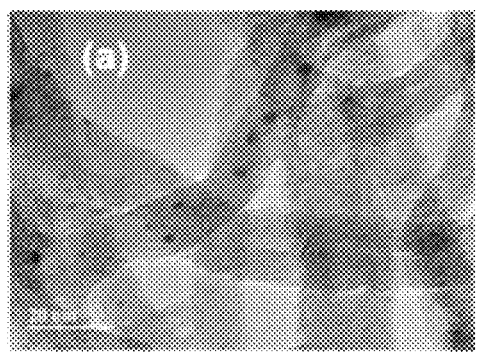
FIG. 3(a) is a transmission electron micrograph of Pd-coated CNTs.
Figure 3B:
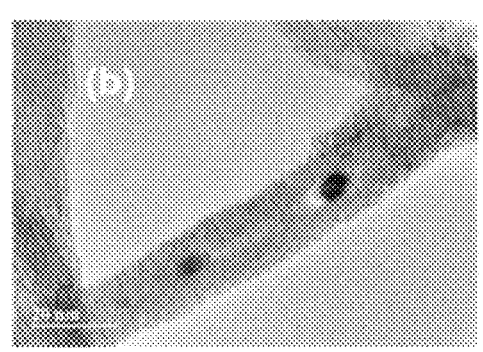
FIG. 3(b) is a transmission electron micrograph of Pd-filled CNTs.
Figure 3C:
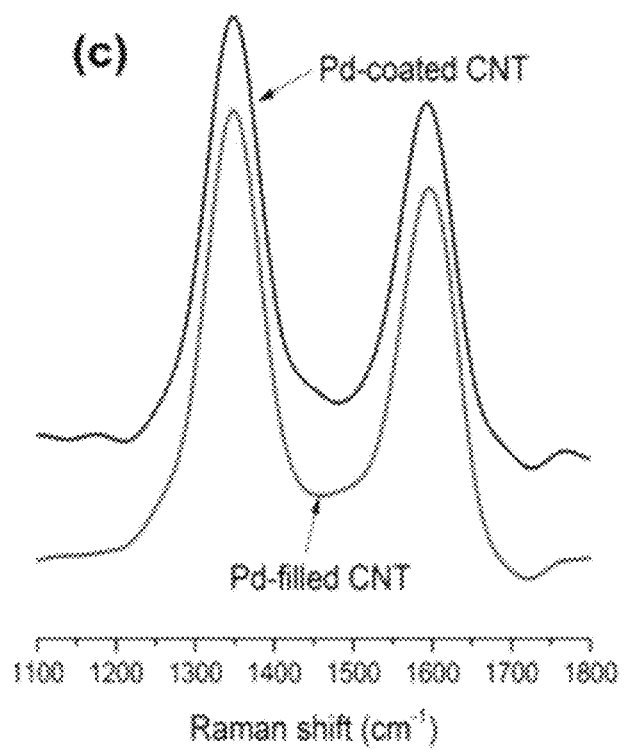
FIG. 3(c) is a plot of a Raman spectrum of Pd-filled and Pd-coated CNTs.

The cathodes of the Li—$O_2$ battery can comprise MWCNTs (pristine, Pd-coated and Pd-filled) coated on the woven carbon cloth gas diffusion layer (CCGDL). Homogenous three-dimensional networks of carbon nanotubes over CCGDL yield high surface area with an open structure which improves the electronic contact during charging and discharging processes. FIGS. 3(a) and 3(b) show TEM images of Pd-coated and Pd-filled CNTs, respectively. Referring FIG. 3(b), in Pd-filled cathodes, Pd nanocatalysts are formed in the inner tubular region of decapped CNTs. FIG. 3(c) shows the Raman spectra of the Pd-coated and Pd-filled CNTs. Referring to FIG. 3(c), D and G bands of Pd-filled and Pd-coated CNTs are identical in location and intensity ratios [I(G)/I(D)~1.2] indicating that the decapped CNTs do not have high density of defects on their surface. The left peak corresponds to the D band and the right peak corresponds to the G band.

Figure 4:
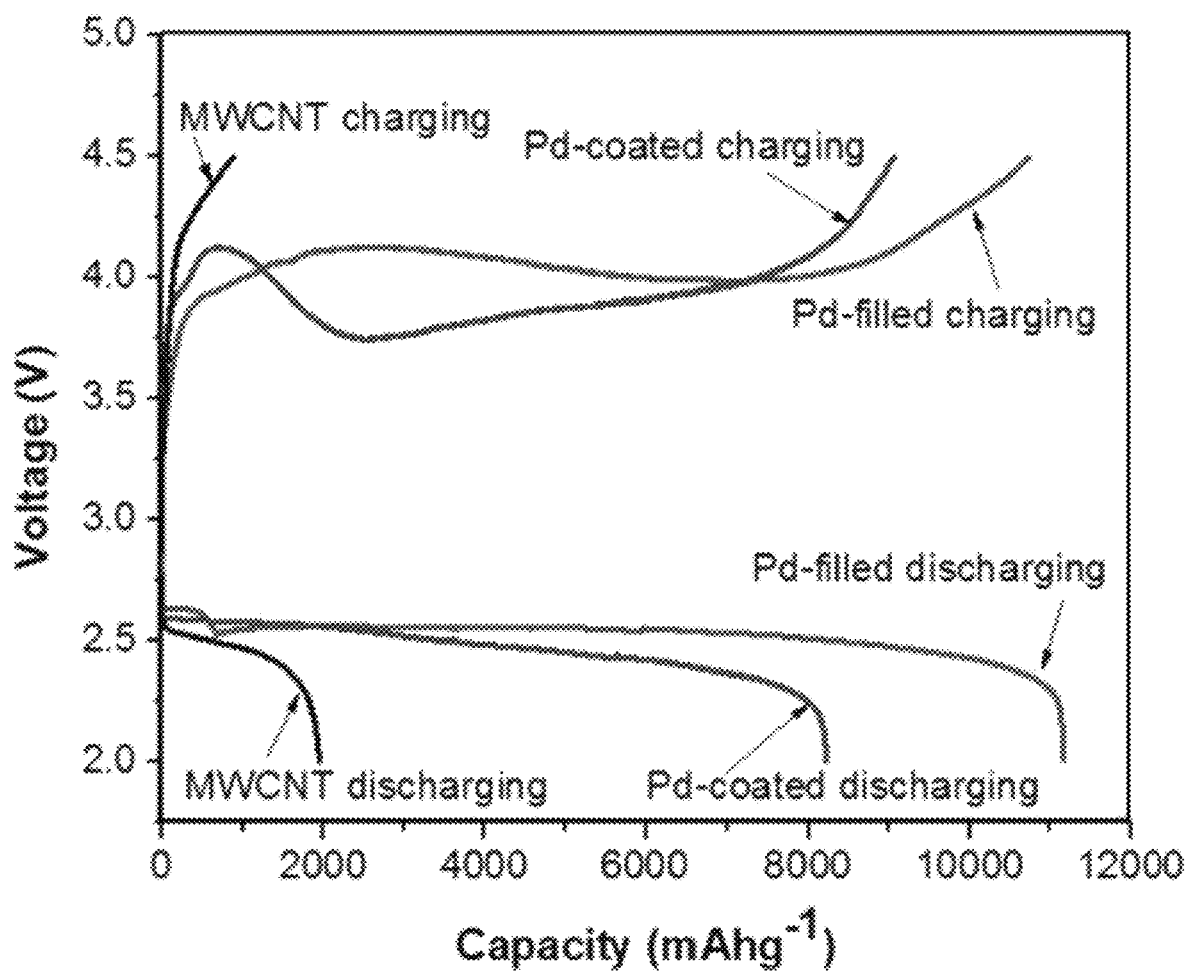
FIG. 4 is a plot of the first discharge/charge capacity of pristine CNT, Pd-coated CNTs and Pd-filled CNTs at a constant current density of 250 mAh.

FIG. 4 shows a plot of the first discharge/charge capacity pf pristine CNT, PD-coated CNTs and Pd-filled CNTs at a constant current density of 250 mAh. The first discharge and charge behaviors of the Pd-coated, Pd-filled and pristine CNTs batteries using 1 M LiTFSI in TEGDME electrolyte in the voltage window of 2.0-4.5 vs Li/Li+ at the constant current density of 250 mA·$g^{-1}$ are shown in FIG. 4. Referring to FIG. 4, the pristine CNTs show a first discharge capacity of 1980 mAh·$g^{-1}$ compared to 8197 mAh·$g^{-1}$ and 11,152 mAh·$g^{-1}$ for the Pd-coated and Pd-filled CNTs, respectively. The ~6-fold discharge capacity improvement of Pd-coated CNTs over pristine CNTs resulted from improved ORR and increased surface sites for lithium discharge product deposition due to the presence of Pd nanocatalysts.

Figure 5:
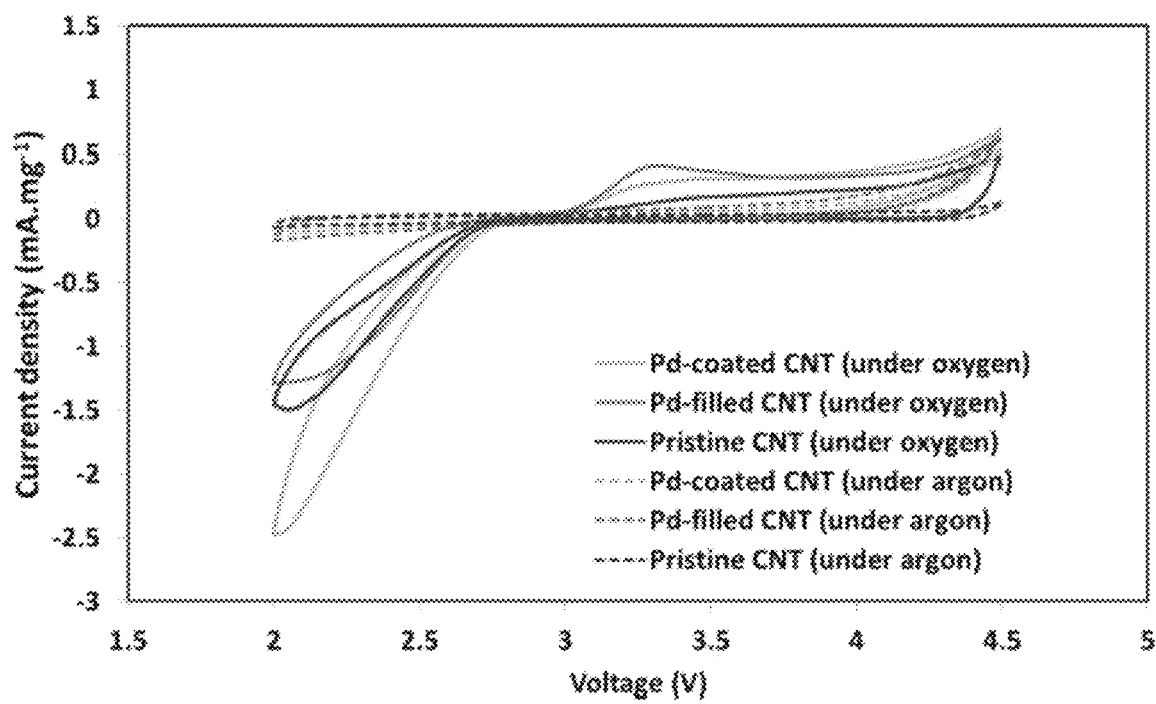
FIG. 5 is a plot of cyclic voltammetry of pristine, Pd-filled, and Pd-coated CNTs in range of 2-4.5 V vs Li/$Li^+$, wherein all scans rates are 1 $mV·s^{-1}$.

FIG. 5 shows a plot of cyclic voltammetry of pristine, Pd-filled, and Pd-coated CNTs in range of 2-4.5 V vs Li/$Li^+$, wherein all scans rates are 1 mV·$s^{-1}$. Referring to FIG. 5, Cyclic voltammetry (CV) measurements confirm higher ORR and OER currents for Pd containing CNTs over pristine CNTs. This also confirms retained catalytic activity of Pd when encapsulated inside the CNTs, consistent with previously observations. In addition, the presence of Pd nanocatalysts in both Pd-filled and Pd-coated CNTs shifts the onset of ORR peak of pristine CNTs from 2.8 V to 2.9 V, showing enhanced cathodic activity. The Pd-filled CNTs also demonstrates a 36% increase in first discharge capacity over Pd-coated. In the FIG. 5, an oxidation peak at ~3.3 V is attributed to the OER and is shown to be more pronounced for the Pd-filled compared to Pd-coated. It is considered that the presence of Pd inside the CNTs strengthens the π electron density on the CNT surface yielding homogeneously distributed nucleation sites for Pd-filled CNTs compared to heterogeneously distributed nucleation sites for Pd-coated CNTs. This delocalization of $Li_2O_2$ seeding sites contributes to intimate contact between $Li_2O_2$ and CNTs and helps promote the formation of high surface discharge products. At voltage exceeding 3.7 V vs Li/Li$^+$ Pd-coated CNTs show the highest rate of oxidation of electrolyte and electrolyte decomposition products.

Figure 6A:
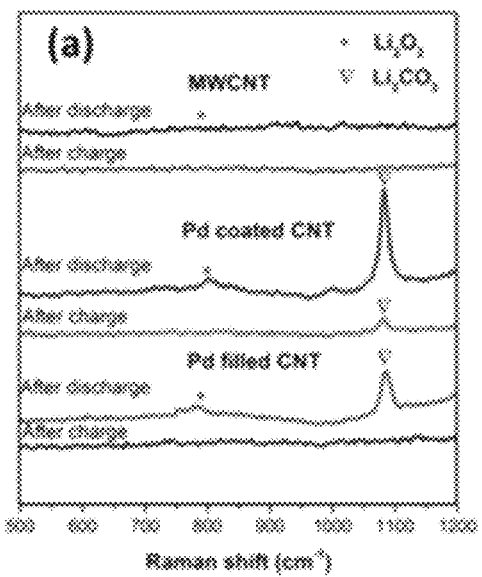
FIG. 6(a) is a plot of Raman spectrum after discharging and charging the batteries for pristine, Pd-coated, and Pd-filled CNTs.

FIG. 6(a) shows a plot of Raman spectrum after discharging and charging the batteries for pristine, Pd-coated, and Pd-filled CNTs. Referring to FIG. 6(a), Raman spectroscopic characterization on the discharged cathodes shows $Li_2O_2$ formation at ~790 cm$^-$Raman shift for all discharged cathodes. However, the Pd-coated CNTs cathode shows a pronounced Raman shift peak at 1080 cm$^{-1}$, which corresponds to the electrolyte decomposition product $Li_2CO_3$. This peak is absent from the pristine CNT cathodes. This behavior confirms the observation from CV, indicating reduced electrolyte stability due to the presence of Pd on Pd-coated CNTs and enhanced electrolyte stability for Pd-filled compared to Pd-coated CNTs. Following charging, Raman spectroscopic analyses on the cathodes shows efficient removal of the $Li_2O_2$ peaks from all cathodes, and a decrease in peak intensity of $Li_2CO_3$ peak for the Pd containing CNTs. The decrease in $Li_2CO_3$ was previously reported to be enabled in catalyst-containing cathodes. $Li_2O_2$ content in the cathode is quantified using a colorimetric approach. The amounts of $Li_2O_2$ in the cathode are determined to be 11.6, 21.4, and 35.4 μmols for pristine, Pd-coated, and Pd-filled CNT cathodes, respectively. These amounts correspond to capacity yields of approximately 88%, 23%, and 37% of the experimental capacities recorded by the pristine, Pd-coated, and Pd-filled CNT cathodes, respectively.

In order to determine the molar ratio of $Li_2O_2$ in the discharged cathodes, the cathodes are analyzed using FTIR. Using peak intensities ratio at 600 cm$^{-1}$ ($Li_2O_2$) and 862 cm$^{-1}$ ($Li_2CO_3$), Pd-coated and Pd-filled cathodes have 19.3% and 33.2% $Li_2O_2$ by mole, respectively. By only considering the $Li_2O_2$ and $Li_2CO_3$ discharge species, this observation is in agreement with the UV-Vis quantification and further confirms the stabilizing effect of the encapsulation of Pd inside the CNTs compared to coating the CNTs. The CV and Raman data also back up these claims, indicating that the electrolyte undergoes more decomposition in cells with Pd-coated CNTs cathodes.

FIG. 6(b) show a plot of an x-ray diffraction patterns confirming the presence of $Li_2O_2$ and $Li_2CO_3$ in Pd-coated and Pd-filled discharged cathodes. Referring to FIG. 6(b), the presence of $Li_2O_2$ and $Li_2CO_3$ is additionally confirmed by XRD.

Figure 7C:
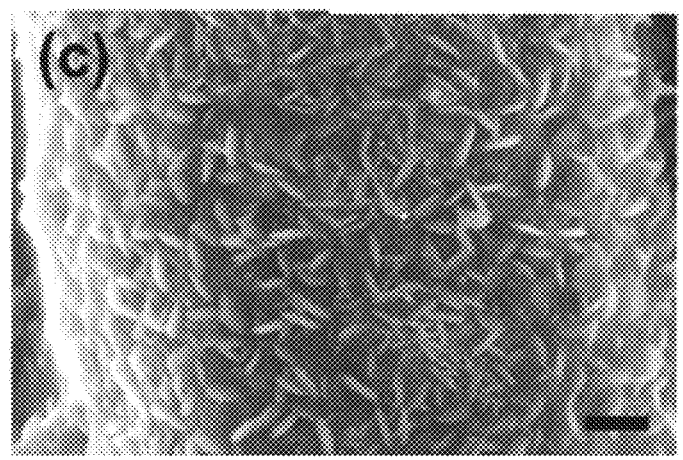
FIG. 7(c) is an image of a scanning electron micrograph of cathodes after discharge for Pd-filled CNTs.

FIGS. 7(a), 7(b), and 7(c) show images of a scanning electron micrograph of cathodes after discharge for pristine CNTs, Pd-coated CNTs, and Pd-filled CNTs, respectively. Referring to FIGS. 7(a), 7(b), and 7(c), the formation of discharge products is visually confirmed using scanning electron microscopy on discharged cathodes. The discharge products ($Li_2O_2$) of the pristine CNTs are conformal around the cathode in rod-like structures with low porosity. The growth of layers in this morphology often yields to passivation and blockage of oxygen to the cathode and eventually limits the discharge capacity and cycle life of the battery. The Pd-coated CNTs cathode as shown FIG. 7(b) shows some platelet-shaped $Li_2O_2$ buried by thick conformal layer, suspected to be $Li_2CO_3$ as shown in Raman and FTIR measurements. In contrast, the Pd-filled CNTs show nano-thin platelets of $Li_2O_2$ covering the cathode as shown FIG. 7(c). These platelets of $Li_2O_2$ yield high surface porosity which in turn do not block the access to the CNTs and enhance the performance.

In order to identify the synergy of electrolyte and Pd nanocatalysts, the oxidation stability limit of the electrolyte is determined using a chronopotentiometric stability test and linear sweep voltammetry under oxygen atmosphere. Batteries using Pd-coated, Pd-filled and pristine CNTs are assembled and charged without prior discharging at constant current density of 250 mA·s$^{-1}$ up to cutoff voltage of 4.5 V.

Figure 8A:
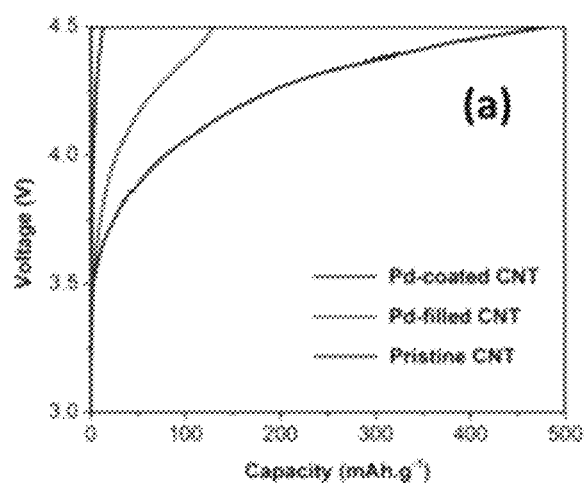
FIG. 8(a) is a plot of a chronopoteniometric test at 250 $mA^{-1}$ from OCV to 4.5 V for pristine, Pd-coated, and Pd-filled CNTs.
Figure 8B:
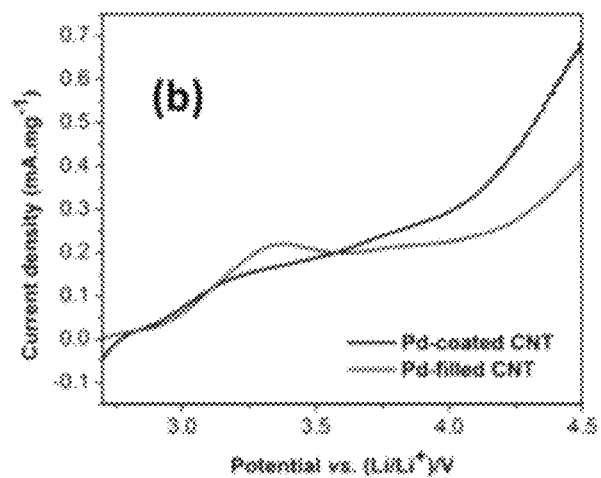
FIG. 8(b) is a plot of a linear sweep voltammetry of pre-discharged Pd-coated and Pd-filled CNTs under oxygen between OCV and 4.5 V vs Li/$Li^+$ at a scan rate of 1 $mV·s^{-1}$, wherein the scale bars are 1 μm.

FIG. 8 shows higher capacity for Pd-coated compared to Pd-filled and pristine. In particular, FIG. 8(a) shows a plot of a chronopoteniometric test at 250 mA·g$^{-1}$ from OCV to 4.5 V for pristine, Pd-coated, and Pd-filled CNTs, and FIG. 8(b) shows a plot of a linear sweep voltammetry of pre-discharged Pd-coated and Pd-filled CNTs under oxygen between OCV and 4.5 V vs Li/Li$^+$ at a scan rate of 1 mV·s$^{-1}$, wherein the scale bars are 1 μm. Since no discharge products existed, the capacities obtained are attributed to electrolyte and cathode undesirable reactions. This suggests that Pd-filled CNTs promotes better stability than Pd-coated CNT cathodes. This observation is also confirmed using linear sweep voltammetry following a discharge showing increased OER peak intensity at 3.3-3.4 V and improved electrolyte stability above 3.7 V vs Li/Li$^+$ for Pd-filled vs Pd-coated CNTs in FIG. 5. These results again support previous observations that encapsulating the Pd nanocatalyst helps improve the electrolyte stability during the operation of the Li—$O_2$ battery.

Figure 9:
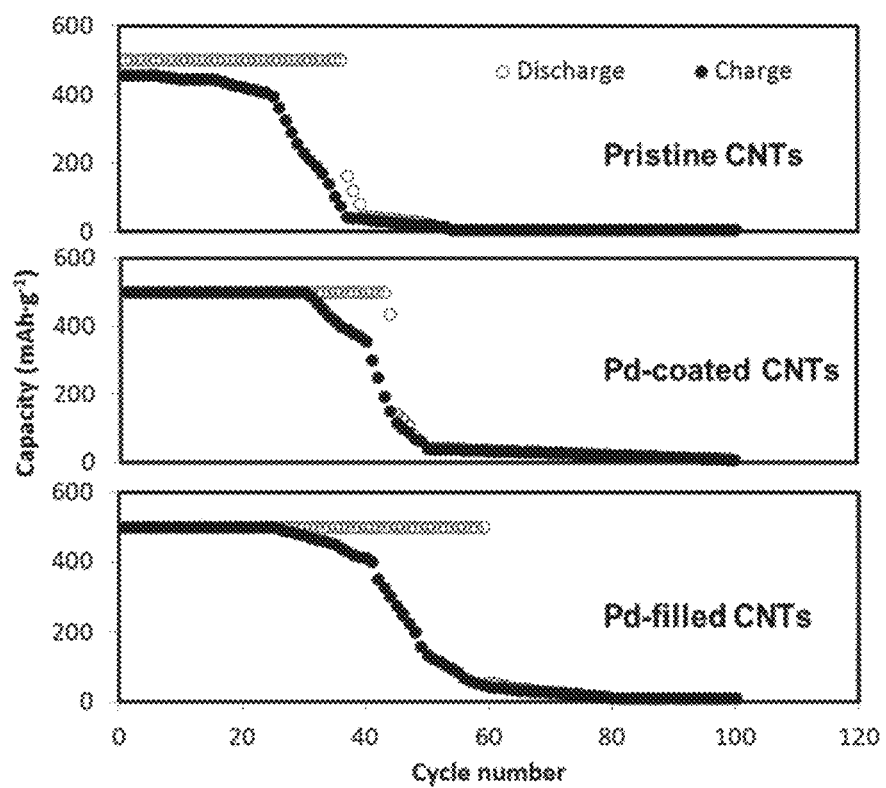
FIG. 9 is a plot of the cyclability of the Li—$O_2$ batteries for fixed cycle capacities of 500 $mAh·g^{-1}$ at a current density of 250 $mA·g^{-1}$ and with voltage cutoffs of 2.04-4.5 V for pristine. Pd-coated, and Pd-filled CNTs. The marker o denotes discharge capacity and the marker ● denotes charge capacity.

FIG. 9 shows the cycling stability of Li—$O_2$ batteries based on Pd-filled, Pd-coated, and pristine CNTs. Referring to FIG. 9, Galvanostatic discharge/charge cycling of Li—$O_2$ batteries at a current density of 250 mA·g$^{-1}$ at a limited capacity of 500 mAh·g$^{-1}$ in a voltage window of 2.0-4.5 V vs Li/Li$^+$ are conducted. Li—$O_2$ cells using Pd-filled CNTs show the highest discharge The cycling stability improvement in the case of Pd-coated and Pd-filled CNTs is a result of previously confirmed OER/ORR improvement due to the Pd nanocatalysts. The cycling stability improvement of Pd-filled CNTs over the Pd-coated CNTs is ultimately credited to the decrease in undesirable discharge/charge products formation, e.g. $Li_2CO_3$, afforded by the encapsulation approach. The inclusion of Pd catalyst in CNTs for use as cathode materials in Li—$O_2$ batteries has been demonstrated. Using two modes of CNT loading, inside (Pd-filled CNTs) and outside (Pd-coated CNTs), shows that both approaches yielded significant improvement in full discharge capacities of the batteries while the Pd-filled cycled for 35% more cycles of 500 mAh·g$^{-1}$ at current density of 250 mA·g$^{-1}$. The encapsulation of nanocatalyst inside the CNTs improves the stability of the electrolyte by decreasing the formation of $Li_2CO_3$ compared to nanocatalyst-coated CNTs. These observations are confirmed by voltammetry, Raman and UV/Vis spectroscopy, FTIR, chronopotentiometry, electron microscopy, and charge/discharge cycling. The Pd-filled CNTs and the Pd-coated CNTs are discussed independently, but the CNTs that are coated with Pd outside and filled with Pd inside at the same time can be used.

The cathodes for a lithium sulfur battery can comprise, for example, Pd-filled, Pt-filled, or pristine CNTs coated on a conductive layer (e.g., an aluminum, copper, silver, or gold layer such as an aluminum, copper, silver, or gold foil). The CNTs can be the same as described above for use in, e.g., an Li—$O_2$ battery cathode and can contain nanocatalysts at a weight percentage of 0.1% to 20% by weight (preferably 0.5%-5% by weight). Sulfur can be added to the cathodes as, for example, elemental sulfur ($S_8$), lithium sulfide ($Li_2S$), and/or lithium polysulfide ($Li_2S_8$, $Li_2S_6$, $Li_2S_4$, $Li_2S_2$, etc.). The sulfur to carbon weight ratio in the cathode can be, for example, 0.2-2.0 (preferably 0.5-1.0). A polymeric binder such as polyvinylidene fluoride (PVDF), polytetrafluoroethylene (PTFE), or carboxymethyl cellulose (CMC) can be used. The film thickness can typically be in a range of 20 micrometers (μm)-400 μm (preferably 100 μm-200 μm). The electrolyte can include, for example, a mixture of 1,3-dioxolane (DOL) and dimethyl ether (DME) with 1:1 by volume containing a lithium salt (e.g., lithium bis(trifluoromethane)sulfonamide) at a predetermined concentration (e.g., a 1 M concentration). The electrolyte can also include a solid-electrolyte interface forming additive such as lithium nitrate (e.g., at 2%-10% by weight, preferably 5% or about 5% by weight). The anode can be, for example, a lithium metal or a lithium metal film on a metallic current collector (e.g., copper).

In one example of cathode preparation for a lithium sulfur battery, CNT:sulfur:PVDF (25:70:5 by weight) are mixed in a dispersing solvent (e.g., n-methyl-2-pyrrolidone (NMP)) to form a slurry or suspension, and the slurry is then coated on an aluminum foil (e.g., using a standard film coating technique such as a Mayer rod or a doctor blade). The film is then dried (e.g., at room temperature for 2 hours) followed by drying (e.g., at 60° C.) under vacuum (e.g., for 12 hours). After drying the film is stored in an inert environment (e.g., an argon-filled glovebox) until cell assembly. For cell assembly the cathode films, lithium foil (purity>99.90%), a polyolefin separator (e.g., a propylene separator) with a thickness of, e.g., 25 μm or about 25 μm, and the DOL:DME electrolyte are used to assemble the coin or pouch cell. The cells are typically rested (e.g., for 6 hours) prior to testing.

Figure 10:
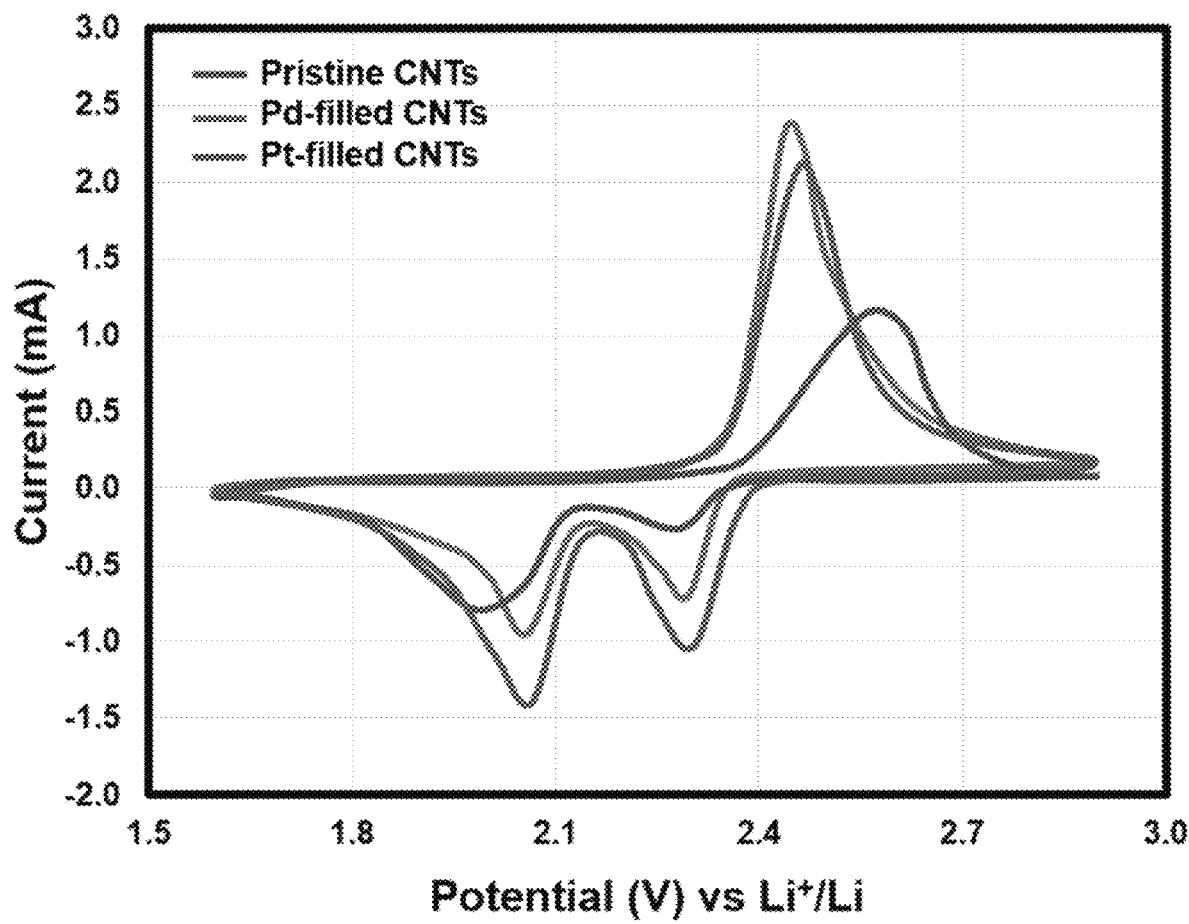
FIG. 10 is a plot of current (in milliamps (mA) versus potential (in Volts (V)), showing the cyclic voltammetry of lithium-sulfur (Li—S) batteries at a scan rate of 0.5 milliVolts per second (mV/s). The (blue) curve with the lowest peak value at 2.45 V is for a Li—S battery containing pristine CNT cathodes; the (green) curve with the highest peak value at 2.45 V is for a Li—S battery containing Pd-filled CNT cathodes; and the (red) curve with the second-highest peak value at 245 V is for a Li—S battery containing platinum (Pt)-filled CNT cathodes.
Figure 11:
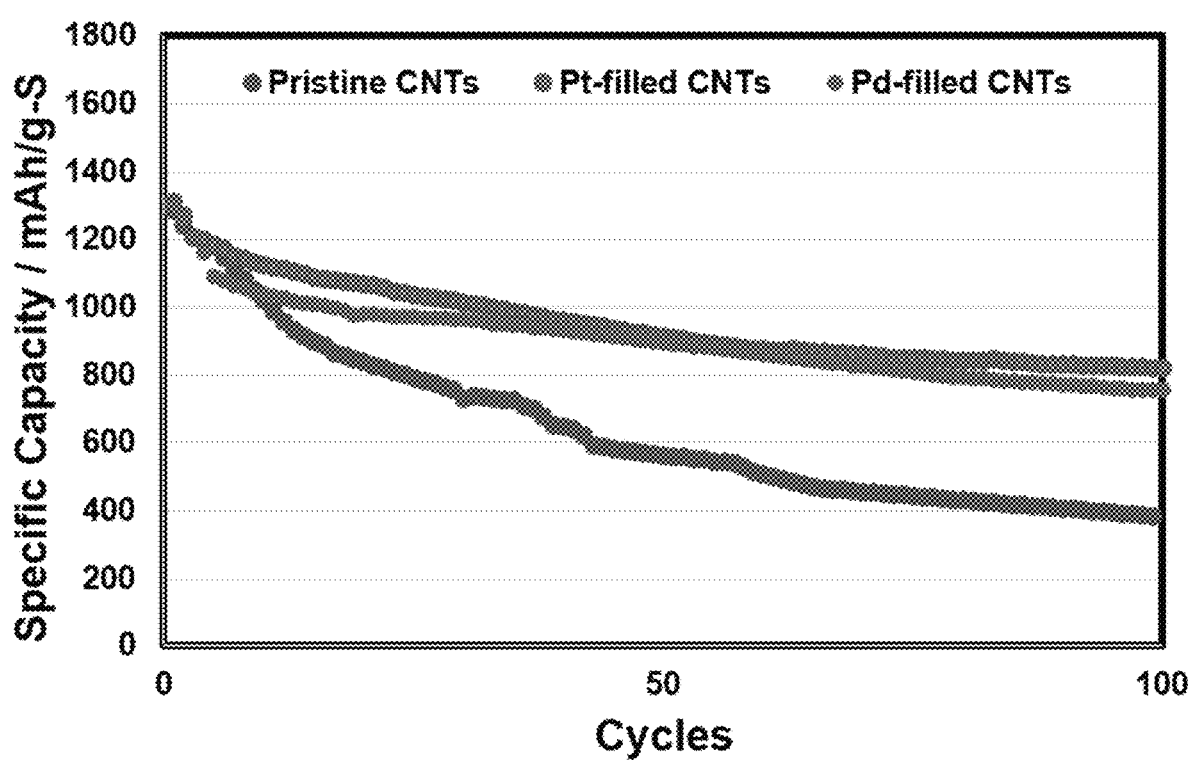
FIG. 11 is a plot of specific capacity (in mAh/(g-s)) versus cycle number, showing the capacity retention due to cycling for the first 100 cycles of Li—S batteries, cycled at 837.5 mA/(g-s) (C/2). The (blue) dots with the lowest value at 50 cycles are for a Li—S battery containing pristine CNT cathodes; the (green) dots with the second-highest value at 50 cycles are for a Li—S battery containing Pd-filled CNT cathodes; and the (red) dots with the highest value at 50 cycles are for a Li—S battery containing Pt-filled CNT cathodes.

A Solartron 1470 battery tester can be used for galvanostatic discharge/charge tests within a voltage range of 1.7-3.0 V at a current density of 167.5 mA (C/10) to 3350 mA (2C) per gram of sulfur. Voltammetry measurements were performed by an electrochemical workstation (Gamry reference 600) at the rate of 1 mV/s in the range of 1.7-3.0 V to investigate the catalytic behavior of the sulfur electrode. All charge/discharge and electrochemical tests were measured in a temperature controlled environment at 25° C. After charge/discharge cycling, the sulfur cathodes were recovered from the batteries in the Ar-filled glove box, rinsed with dimethyl ether and dried under vacuum. Cathodes can be investigated by Raman spectroscopy (BaySpec's Nomadic, excitation wavelength of 532 nm), Fourier transform infrared (FTIR) spectroscopy (JASCO FT-IR 4100), and/or Scanning electron microscopy (SEM) (JEOL 6330F). Bruker GADDS/D8 X-ray powder diffraction (XRD) with MacSci rotating Molybdenum anode (k=0.71073) operated at 50 kV generator and 20 mA current was also used to collect the diffraction patterns. Transmission Electron Microscopy (Phillips CM-200 200 kV) was also used to inspect the carbon nanotubes. FIG. 10 shows a plot of cyclic voltammetry of pristine CNTs, Pd-filled CNTs, and Pt-filled CNTs in range of 1.6-2.9 V versus Li/Li+, wherein all scans rates were 0.5 mV/s. Referring to FIG. 10, cyclic voltammetry (CV) measurements confirm higher cathode and anodic currents for Pd- and Pt-containing CNTs over pristine CNTs and lower charge to discharge overpotential. Prisitne CNTs cathodes also had broader peaks. FIG. 11 shows the capacity retention due to cycling of the pristine CNT, Pd-filled CNT, and Pt-filled CNT lithium sulfur batteries for the first 100 cycles. Referring to FIG. 11, the capacity retention was improved when either Pd or Pt nanocatalysts were embedded in the CNTs. Lithium sulfur batteries containing Pd-filled CNT cathodes or Pt-filled CNT cathodes retained almost double the capacity of batteries containing pristine CNT cathodes after 100 cycles of full charge and discharge.

In an embodiment, a lithium sulfur battery can comprise an anode, a cathode, and an electrolyte disposed between the anode and the cathode, where the cathode comprises: a conductive layer (e.g., an aluminum, copper, silver, or gold layer such as an aluminum, copper, silver, or gold foil) coated with a sulfur source; and a carbon structure having a catalyst filled therein without a surface coating of the catalyst on the carbon structure. The catalyst can include, for example, nanoparticles of a platinum group metal (e.g., at least one of ruthenium, rhodium, palladium, osmium, iridium, and platinum). For example, the catalyst can be a palladium nanoparticle catalyst. The carbon structure can include at least one of graphene, fullerenes, amorphous carbons, and carbon nanotubes (e.g., multi-walled carbon nanotubes). The carbon structure can be coated on the conductive layer. The sulfur source can comprise, for example, elemental sulfur, lithium sulfide, lithium polysulfide, or a combination thereof. The lithium sulfur battery can further comprise a separator (e.g., a polyolefin separator such as a polypropylene separator) disposed between the anode and the cathode, the electrolyte being soaked in the separator.

In an embodiment, a lithium sulfur battery can comprise an anode, a cathode, and a separator including an electrolyte and disposed between the anode and the cathode, where the cathode comprises: a conductive layer (e.g., an aluminum, copper, silver, or gold layer such as an aluminum, copper, silver, or gold foil) coated with a sulfur source; a multi-walled carbon nanotube coated on the conductive layer; and a catalyst filled in an annular cavity of the multi-walled carbon nanotube without a surface coating of the catalyst on the multi-walled carbon nanotube. The catalyst can be, for example, a palladium nanoparticle catalyst. The electrolyte can include a lithium salt. The lithium sulfur battery can further comprise a conductive current collector (e.g., a stainless steel rod) disposed on the cathode and/or a conductive current collector (e.g., a stainless steel rod) disposed on the anode. The separator can be a polyolefin separator (e.g., a polypropylene separator), and/or the electrolyte can be soaked in the separator.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:
1. A lithium sulfur battery, comprising:
an anode;
a cathode
an electrolyte disposed between the anode and the cathode; and
a separator disposed between the anode and the cathode, the cathode comprising:
a conductive layer coated with a sulfur source; and
a carbon structure having a catalyst filled therein without a surface coating of the catalyst on the carbon structure, the catalyst having nanoparticles of a platinum group metal, and the carbon structure being coated on the conductive layer.

2. The lithium sulfur battery according to claim 1, the platinum group metal including at least one of ruthenium, rhodium, palladium, osmium, iridium, and platinum.

3. The lithium sulfur battery according to claim 1, the catalyst being a palladium nanoparticle catalyst.

4. The lithium sulfur battery according to claim 1, the sulfur source comprising at least one of elemental sulfur, lithium sulfide, and lithium polysulfide.

5. The lithium sulfur battery according to claim 1, the electrolyte being soaked in the separator.

6. The lithium sulfur battery according to claim 1, the separator being a polyolefin separator.

7. The lithium sulfur battery according to claim 1, the conductive layer being an aluminum foil.

8. The lithium sulfur battery according to claim 1, the electrolyte including a lithium salt.

9. The lithium sulfur battery according to claim 1, further comprising:
 a first conductive current collector disposed on the cathode, the first conductive current collector being porous; and
 a second conductive current collector disposed on the anode.

10. The lithium sulfur battery according to claim 9, the first conductive current collector being a stainless steel tube, and
 the second conductive current collector being a stainless steel rod.

11. The lithium sulfur battery according to claim 1, the catalyst being a palladium nanoparticle catalyst,
 the sulfur source comprising at least one of elemental sulfur, lithium sulfide, and lithium polysulfide,
 the electrolyte being soaked in the separator,
 the separator being a polyolefin separator,
 the conductive layer being an aluminum foil,
 the electrolyte including a lithium salt,
 the lithium sulfur battery further comprising:
  a first conductive current collector disposed on the cathode, the first conductive current collector being porous; and
  a second conductive current collector disposed on the anode,
 the first conductive current collector being a stainless steel tube, and
 the second conductive current collector being a stainless steel rod.

12. A lithium battery, comprising:
 an anode;
 a cathode; and
 a separator including an electrolyte and disposed between the anode and the cathode,
 the cathode comprising a carbon cloth gas diffusion layer, a multi-walled carbon nanotube coated on the carbon cloth gas diffusion layer, and a catalyst filled in an annular cavity of the multi-walled carbon nanotube without a surface coating of the catalyst on the multi-walled carbon nanotube,
 the catalyst comprising nanoparticles of a platinum group metal,
 the lithium battery being a lithium sulfur battery, and
 the cathode further comprising a sulfur source.

13. The lithium battery according to claim 12, the platinum group metal including at least one of ruthenium, rhodium, palladium, osmium, iridium, and platinum.

14. A lithium battery, comprising:
 an anode;
 a cathode; and
 a separator including an electrolyte and disposed between the anode and the cathode,
 the cathode comprising a carbon cloth gas diffusion layer, a multi-walled carbon nanotube coated on the carbon cloth gas diffusion layer, and a catalyst filled in an annular cavity of the multi-walled carbon nanotube without a surface coating of the catalyst on the multi-walled carbon nanotube,
 the catalyst comprising nanoparticles of a platinum group metal, and
 the catalyst being a palladium nanoparticle catalyst.

15. The lithium battery according to claim 12, the separator being a polypropylene separator, and
 the electrolyte being soaked in the separator.

16. The lithium battery according to claim 12, the electrolyte including a lithium salt.

17. The lithium battery according to claim 12, further comprising:
 a first conductive current collector disposed on the cathode, the first conductive current collector being porous; and
 a second conductive current collector disposed on the anode.

18. The lithium battery according to claim 17, the first conductive current collector being a stainless steel tube, and
 the second conductive current collector being a stainless steel rod.

19. A lithium sulfur battery, comprising:
 an anode;
 a cathode;
 a separator including an electrolyte and disposed between the anode and the cathode;
 a first conductive current collector disposed on the cathode, the first conductive current collector being porous; and
 a second conductive current collector disposed on the anode,
 the cathode comprising a carbon cloth gas diffusion layer, a multi-walled carbon nanotube coated on the carbon cloth gas diffusion layer, a sulfur source, and a catalyst filled in an annular cavity of the multi-walled carbon nanotube without a surface coating of the catalyst on the multi-walled carbon nanotube,
 the catalyst comprising nanoparticles of a platinum group metal,
 the platinum group metal including at least one of ruthenium, rhodium, palladium, osmium, iridium, and platinum,
 the separator being a polypropylene separator,
 the electrolyte being soaked in the separator,
 the electrolyte including a lithium salt,
 the first conductive current collector being a stainless steel tube, and the second conductive current collector being a stainless steel rod.

* * * * *